United States Patent [19]

Weisz

[11] 4,108,713

[45] Aug. 22, 1978

[54] LOW MASS ELECTRIC HEATER

[75] Inventor: Thomas Anthony Weisz, Wheeling, Ill.

[73] Assignee: General Binding Corporation, Northbrook, Ill.

[21] Appl. No.: 768,267

[22] Filed: Feb. 14, 1977

[51] Int. Cl.[2] .................... B32B 31/00; B42C 19/00; H05B 1/100

[52] U.S. Cl. .................................. 156/499; 11/1 AD; 156/583; 219/243; 219/505

[58] Field of Search ................ 156/499, 583; 219/243, 219/504, 505, 549; 11/1 AD

[56] References Cited

U.S. PATENT DOCUMENTS

| | | | |
|---|---|---|---|
| 3,153,140 | 10/1964 | Theodore et al. | 219/549 |
| 3,283,284 | 11/1966 | Eisler | 219/549 |
| 3,569,665 | 3/1971 | Hager | 219/243 |
| 3,973,787 | 8/1976 | Staats et al. | 156/212 |

*Primary Examiner*—Douglas J. Drummond
*Attorney, Agent, or Firm*—Hill, Gross, Simpson, Van Santen, Steadman, Chiara & Simpson

[57] ABSTRACT

A low mass electrical heater for rapid heating of a heat reactivatable adhesive, such as used in laminating machines or book binding machines, incorporates a low mass, low heat capacity metal plate. The plate is constructed of either magnesium or aluminum and has a thickness of less than 0.1 inch. An electrical insulating layer comprising silicone rubber is bound to one surface of the metal plate and a resistance type heating element is arranged in a pattern on the insulating layer. The heating element preferably has a high watt density of greater than 20 watts/in.$^2$. A fast-acting temperature sensor is arranged between the heating element and the first silicone layer. The sensor preferably is a thermistor having a thickness of less than 0.06 inches. When the electrical heater is used in a book binder, the heater is mounted on a pivoting means and the book binding to be heated has its backbone positioned on a heat transfer surface of the heating element metal plate. The metal plate then oscillates to permit leaves of the booklet to be slashed into an adhesive layer which is melted by the electrical heater. When used in a laminating machine, the heater is positioned adjacent a pouch to be laminated such that heat is transferred to the heat reactivatable adhesive of the pouch to permit sealing.

20 Claims, 5 Drawing Figures

Fig-1
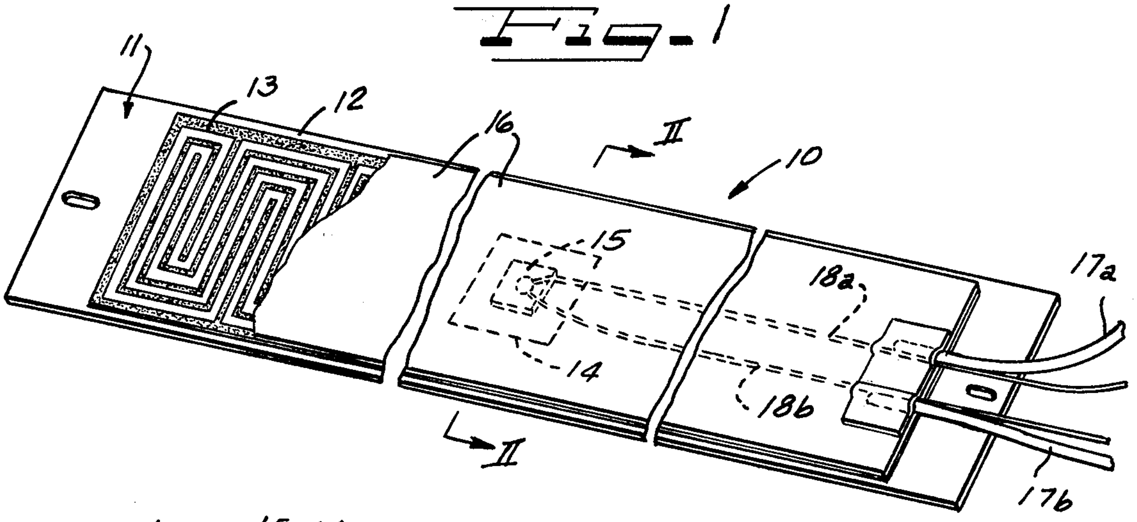
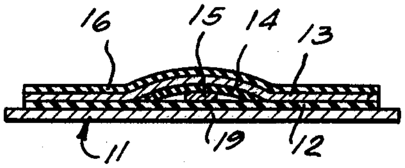
Fig-2
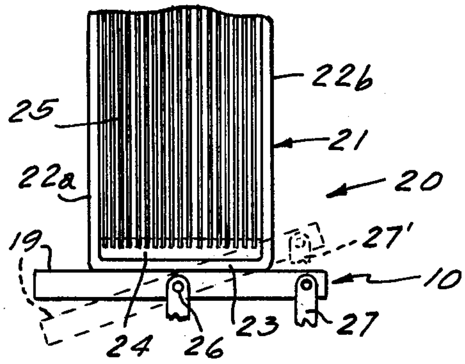
Fig-3
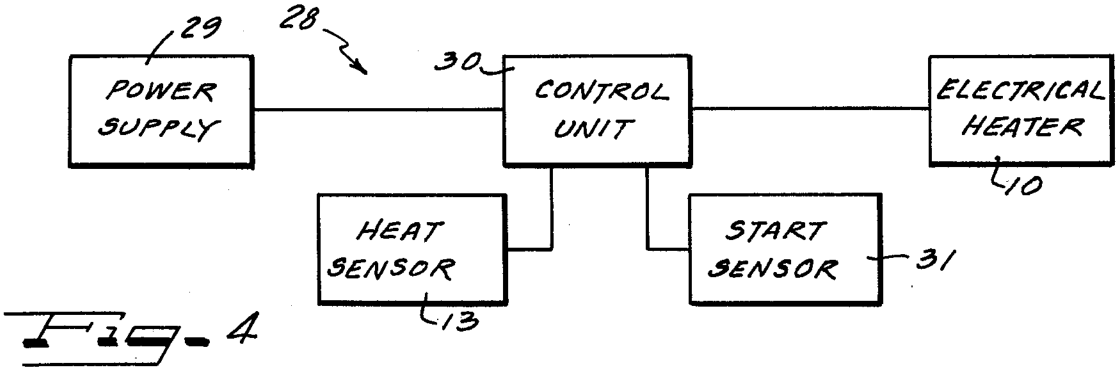
Fig-4
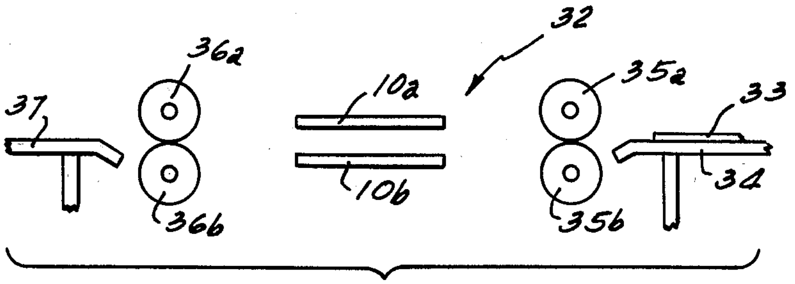
Fig-5

LOW MASS ELECTRIC HEATER

BACKGROUND OF THE INVENTION

1. Field of the Invention

This invention relates to electrical heaters and more particularly to electrical heaters for melting of heat reactivatable adhesives.

2. Description of the Prior Art

Electrical heaters having a relatively thick plate such as 0.1 inch or greater and constructed of a metal having relatively high heat capacity and high mass are known. One such heating element is constructed by Safeway Products, Inc., Middletown, Conn., in which a resistance type heating element is etched or printed on a silicone rubber layer which is bound to one surface of the plate. A relatively slow acting thermistor having a thickness of 0.06 inches or greater is then provided over the heating element and spaced therefrom by a rubber silicone layer.

In applications where a heat reactivatable adhesive is to be melted, it may be desirable to provide a heating element which has both a high heat output combined with the features of rapid heating and rapid cooling. With the above described prior art heating element, rapid heating and cooling of the electrical heater was hindered by the relatively thick metal plates having high heat capacity and high mass used in the heater. Furthermore, in prior art electrical heaters, although the importance of fast acting temperature sensing devices is known, only relatively slow acting temperature sensing devices are utilized in combination with the known electrical heaters. Since rapid heating requires a relatively high density of power from the heating elements, it is important that the temperatures obtained be sensed very rapidly in order to shut off the heating element prior to self-destruction. Consequently, the prior art heating elements with their slow reacting heat sensors and high heat capacities are not adapted for rapid heating and cooling.

In the book binding machine described in U.S. Pat. No. 3,973,787 issued Aug. 10, 1976 to Staats et al, a heating plate is described on which the backbone of a booklet cover is positioned such that a layer of adhesive covering an inside portion of the backbone will be melted. The heating element is pivotably mounted to permit rocking of the booklet to allow the book leaves to be slashed into the melted adhesive. With such a system, the use of prior art heaters required a long warm-up time coupled with a long cooling time. Consequently, a one-shot melting operation was time-inefficient and for cooling it was desirable to remove the book from the heating element.

In the laminating machine described in U.S. Pat. No. 3,711,355 issued on Jan. 16, 1973 to Staats et al, heaters are utilized which radiate heat to the surface of a pouch comprised of heat reactivatable adhesives. Again, with such a machine, use of the prior art heaters requires a long warm-up time and thus rendered one-shot operation inefficient.

SUMMARY OF THE INVENTION

It is an object of this invention to provide an electrical heater which has both extremely low mass and high power density to permit rapid heating and cooling.

It is a further object of this invention to provide an electrical heater having rapid heating and cooling characteristics combined with high power density for melting of an adhesive used in a book binding machine.

It is another object of this invention to provide an electrical heater of low mass and high power density to permit rapid heating of heat reactivatable adhesives in a laminating machine.

It is a further object of this invention to provide an electrical heater having a low mass and high power density for use in a book binding machine to permit rapid heating for one-shot operation and rapid cooling to permit a booklet to remain in contact with the heater and be rapidly cooled.

The electrical heater of this invention for heating and/or melting an adhesive comprises a very low-mass, low heat capacity metal plate constructed of either magnesium or aluminum and preferably having a thickness of less than 0.1 inch. An electrical insulating layer preferably formed of silicone rubber is applied to one side of the metal plate. A heating element preferably of the resistance type is arranged in a pattern on the silicone rubber layer. A fast-acting temperature sensing means such as a thermistor is arranged between the heating element and the silicone layer. Preferably the heat sensor is a thermistor having a thickness of less than 0.05 inches.

The electrical heater of this invention has a high watt density of at least 20 watts/in.$^2$ and will heat the surface of the plate to 300° F. in less than 30 seconds.

BRIEF DESCRIPTION OF THE DRAWINGS

FIG. 1 is a perspective view of the improved electrical heater of this invention illustrating a portion of the heating element below a cut away of a top silicone layer;

FIG. 2 is a cross-sectional view taken along line II—II of FIG. 1;

FIG. 3 is a side view of an adhesive book binding machine utilizing the electrical heater of this invention;

FIG. 4 is a block diagram illustrating a control system for the machine of FIG. 3; and FIG. 5 is a side view of a laminating machine utilizing the electrical heater of this invention.

DESCRIPTION OF THE PREFERRED EMBODIMENTS

The low-mass, high watt density electrical heater of this invention is generally shown at 10 in FIG. 1. A magnesium or aluminum plate 11 has a first silicone rubber layer applied to one side thereof. The plate 11 has a thickness of less than 0.1 inch and preferably about 0.03 inches. A resistance type heating element 13 is etched or printed as a nickel-iron alloy pattern on the first silicone-rubber layer 12 and over an area approximately coincident with the area of the plate 11. With appropriate operating voltages (typically household voltages) applied, the heating element provides a power density of at least 20 watts/in.$^2$ and preferably 20 to 25 watts/in.$^2$. A temperature sensor 15 is positioned between the first silicone layer 12 and the heating element 13. A second silicone rubber layer 14 covering only the sensor 15 separates the sensor from the heating element. A third silicone rubber layer 16 is then arranged over the heating element 13. Power leads 17*a,b* and temperature sensor leads 18*a,b* are covered by the third silicone rubber layer 16 and brought out for connection to external control circuitry.

The temperature sensor 15 is preferably a small thermistor having a glass enclosure and low mass. Preferably the thermistor has a thickness of less than 0.05 inches.

With the electrical heater described above, an object either in contact or near the heat transfer surface 19 will be rapidly heated when power is applied to the power leads 17*a,b*. The electrical heater of this invention is designed to achieve a temperature of 300° F. at a point on the plate 11 in less than 30 seconds. The very high power density of 20–25 watts/in.$^2$ requires that the thermistor act as rapidly as possible in order to shut down power to the heating element 13 at the appropriate time to prevent burn out. Furthermore, since the temperature sensor 15 is between the heating element 13 and the plate 11, heating of the plate 11 rapidly causes conductivity changes in the temperature sensing thermistor 15.

With the electrical heater of this invention, a very high heat output is achieved to permit rapid heating of heat reactivatable adhesives in nearby proximity to the heater 10. Also, since the plate 11 has a low mass and low heat capacity, both heating and cooling is very rapid. Finally, since the temperature sensor 15 is quick reacting, the problem of burn out usually associated with such high power density heat elements is solved.

A hot melt adhesive book binding machine similar to that of U.S. Pat. No. 3,973,787 is generally shown at 20 in FIG. 3. Typically, sheets 25 are bound within a booklet 21 by a hot melt adhesive 24 positioned along a backbone 23 of the booklet 21.

Initially, the sheets 25 are positioned between the cover leaves 22*a,b* such that edges of the sheet rest upon the hot melt adhesive 24. The electrical heater 10 of this invention is mounted on a pivot member 26 and the booklet 21 rests upon a heat transfer surface 19 of the electrical heater 10 such that heat is transferred through to the adhesive 24 along the backbone 23. A drive means 27 is provided for tipping the heater 10 and booklet 21 such that after melting of the adhesive 24, the sheets 25 are slashed into intimate contact with the adhesive 24.

A control system 28 for the book binding machine 20 of FIG. 3 is shown in FIG. 4. A power supply 29 connects to a control unit 30. The heater 10 of this invention together with the heat sensor 13 on the heater 10 connects to a control unit 30. A start sensor 31, such as a photocell, also connects to the control unit.

Initially, the booklet 21 is inserted in the machine 20. Entry of the book 21 is sensed by the start sensor 31 which activates the control unit to feed power to the heater 10. When the heater 10 reaches a predetermined temperature such as 375° as determined by the thermistor, the control unit automatically turns off the power to the heating element. Typically, the adhesive achieves flowability at about 200° F, but this can widely vary. Preferably immediately after turn off, the booklet 21 resting upon the heater 10 is rocked back and forth by rocking the metal plate to permit the sheets 25 to slash into the melted adhesive 24 for intimate contact therewith. The rocking continues in one preferred embodiment for 15 seconds after power is disconnected to the heater 10. An alarm then sounds and the book is removed. Thereafter, a second book may be inserted and the entire cycle repeated. The cycle for one book lasts at least 25 seconds. As an alternative, a book may be left in position to cool since the heater 10 of this invention both heats and cools very rapidly. A cooling system such as a fan may then be directed onto the book as it cools on top of the heater 10.

By using the heater element of this invention in a book binder, one-shot operations become more efficient since an operator does not have to wait for warm-up of the heater. Furthermore, in some embodiments rapid cooling will permit cooling of the book without removal from the heater. With some book binding adhesives, the adhesive is slow to cool and solidify. Consequently, it may be preferable not to disturb the book and cool it directly on the heating plate. Finally, by employing a rapid heating plate in accordance with this invention, dripping problems which occur in devices having relatively slow heating characteristics is avoided.

Another embodiment of the invention is shown in FIG. 5 where heating elements 10*a,b* of this invention are combined with a heat reactivatable adhesive laminating machine 32 (see U.S. Pat. No. 3,711,355). Typically, a film pouch 33 comprised of heat reactivatable adhesives is placed around an I.D. card to be laminated. The pouch 33 is then placed on an input table 34 where it engages feed rollers 35*a,b*. Upper and lower electrical heaters of this invention 10*a,b* then heat the heat reactivatable adhesives during passage through the channel formed between the heaters 10*a,b*. Laminating rollers 36*a,b* then engage the pouch 33 and feed the laminated pouch to the output table 37. In such a system, the melting point typically utilized is 200°–220° F.

The high watt density of the heater 10 of this invention combined with the rapid heating and cooling permits rapid one-shot operation without the need to wait for warm-up of the laminating machine.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A rapid heating, low mass electrical heater comprising:
   (a) a low mass, low heat capacity plate comprised of an element selected from the group consisting of magnesium and aluminum, said plate having a thickness of less than 0.1 inch;
   (b) an electrical insulating layer on one side of the metal plate;
   (c) a heating element arranged in a pattern on said insulating layer; and
   (d) a fast-acting temperature sensing means arranged adjacent said heating element, said heat sensing means having a thickness of less than 0.06 inches.

2. The heater of claim 1 in which said heating element is a resistive type and is arranged to provide a power density of at least 20 watts/in.$^2$.

3. The heater of claim 1 in which said heating element heats a point on the metal plate to 300° F in less than 30 seconds.

4. The heater of claim 1 in which said insulating layer consists of a first layer of silicone rubber, the temperature sensing means is arranged on the first layer, and a second layer of silicone rubber covers the temperature sensing means and separates the same from the heating element.

5. The heater of claim 1 in which said temperature sensing means comprises a thermistor.

6. An electrical heater for rapid warm-up and high heat transfer by surface contact to an object, comprising:

(a) a metal plate having a thickness of less than 0.1 inch and comprised of an element selected from the group consisting of magnesium and aluminum, a contact surface of said metal plate being provided for contact with the object to be heated;
(b) a first rubber layer on a side of said metal plate opposite from said contact surface;
(c) a resistance type heating element provided in a pattern on said first rubber layer, said heating element capable of raising the temperature of a point on said metal plate to 300° F in less than 30 seconds and of providing a power density of at least 20 watts/in.$^2$; and
(d) a thermistor heat sensing element having a thickness of less than 0.06 inches, said heat sensing element being located between the heating element and the first rubber layer, a second rubber layer separating the heating element from the sensing element.

7. A machine for rapid heating of a chemical adhesive used to connnect first and second objects together, comprising:
(a) a rapid heating, low mass electrical heater having
(i) a metal plate comprised of an element selected from the group consisting of magnesium and aluminum, said plate having a thickness of less than 0.1 inch,
(ii) an electrical insulating layer on one side of the metal plate,
(iii) a resistance type heating element arranged in a pattern on said insulating layer, and
(iv) a fast-acting temperature sensing means arranged adjacent said heating element; and
(b) means for positioning the first and second objects to be bound by the chemical adhesive such that the chemical adhesive is positioned adjacent said electrical heater for heat transfer to the adhesive.

8. The machine of claim 7 in which said means for positioning comprises a laminating means having feed roller means and laminating roller means with said electrical heater being positioned therebetween, said laminating means positioning the objects to be laminated adjacent said electrical heater.

9. The machine of claim 7 in which said means for positioning comprises a book binding means for positioning a backbone of a book cover in contact with a surface of said metal plate in order to melt adhesive along the backbone into contact with book leaves.

10. In an adhesive binding machine for melting adhesive along a backbone of a booklet so that the adhesive will engage leaves of the booklet, the improvement which comprises:
(a) a heater having a metal plate with a thickness of less than 0.1 inch and comprised of an element selected from the group consisting of aluminum and magnesium, a heating element also being provided over the metal plate; and
(b) an automatic control system means for applying full power until a preset temperature is reached, after which power is shut off.

11. The machine of claim 10 in which said heating element has a power density of at least 20 watts/in.$^2$.

12. In a heat reactivatable adhesive booklet binding machine having means for positioning a backbone of a book near a heater to melt adhesive along the backbone for engagement of book leaves, the improvement comprising a low mass, high watt density electrical heater having:
(a) a metal plate comprised of an element selected from the group consisting of magnesium and aluminum and having a thickness less than 0.1 inches, a contact surface side of said metal plate being positioned adjacent the backbone of the book;
(b) an insulating layer on one side of the metal plate;
(c) a resistance type heating element arranged in a pattern on said insulating layer; and
(d) a fast-acting temperature sensing means arranged adjacent said heating element.

13. The binding machine of claim 12 in which the booklet backbone rests upon said metal plate contact surface, and said heater is mounted on pivot means for tilting the booklet to permit the book leaves to slash into the adhesive.

14. The binding machine of claim 11 in which said electrical heater has a thickness of approximately 0.03 inches.

15. The binding machine of claim 12 in which said heating element is arranged to provide a power density of at least 20/watts in.$^2$.

16. The binding machine of claim 11 in which said heating element heats a point on the metal plate to 300° F. in less than 30 seconds.

17. The binding machine of claim 12 in which said insulating layer consists of a first layer of silicone rubber, a second layer of silicone rubber being provided between the heating element and the temperature sensing means.

18. The binding machine of claim 12 in which said fast-acting temperature sensing means comprises a thermistor of thickness less than 0.05 inches.

19. The binding machine of claim 12 in which a control system means is connected to said heating element for applying power to said heating element until a preset temperature is reached by said heat sensing means after which power is shut off.

20. The binding machine of claim 19 in which said control system means applies power intermittently in response to the temperature sensor for a fixed subsequent time interval and then shuts off until the next binding cycle is initiated.

* * * * *